(12) United States Patent
Kappler et al.

(10) Patent No.: US 6,448,328 B1
(45) Date of Patent: Sep. 10, 2002

(54) PAINTS COMPRISING AQUEOUS DISPERSIONS OF HYDROXYLATED FLUORINATED COPOLYMERS

(75) Inventors: Patrick Kappler, Ecully; Jean Luc Perillon, Bernay; Catherine Savary, Ajou, all of (FR)

(73) Assignee: Atofina (FR)

( * ) Notice: Subject to any disclaimer, the term of this patent is extended or adjusted under 35 U.S.C. 154(b) by 0 days.

(21) Appl. No.: 08/453,149

(22) Filed: May 30, 1995

(30) Foreign Application Priority Data

Jun. 1, 1994 (FR) .............................. 94 06682

(51) Int. Cl.⁷ .................. C08L 27/12; C08L 27/16; C08L 27/18
(52) U.S. Cl. .................. 524/520; 524/544; 524/545; 524/546
(58) Field of Search ................ 524/545, 546, 524/520, 543, 544; 526/255, 245, 250

(56) References Cited

U.S. PATENT DOCUMENTS

| | | | |
|---|---|---|---|
| 3,651,003 A | * 3/1972 | Betchold | 524/546 X |
| 5,037,922 A | 8/1991 | Kappler et al. | 526/249 |
| 5,079,320 A | 1/1992 | Kappler et al. | 526/249 |
| 5,082,911 A | 1/1992 | Kappler et al. | 526/249 |
| 5,098,972 A | 3/1992 | Kappler et al. | 526/249 |
| 5,136,001 A | 8/1992 | Kappler et al. | 526/245 |
| 5,166,284 A | 11/1992 | Kappler et al. | 526/249 |
| 5,200,479 A | 4/1993 | Kappler et al. | 526/212 |
| 5,216,081 A | * 6/1993 | Mohri et al. | 524/520 X |
| 5,231,155 A | 7/1993 | Kappler et al. | 526/249 |
| 5,258,447 A | * 11/1993 | Koishi et al. | 524/546 X |

OTHER PUBLICATIONS

Tournut, *Macromol. Symp. 82*, pp. 99–109 (1994).

* cited by examiner

*Primary Examiner*—Judy M. Reddick
(74) *Attorney, Agent, or Firm*—Pennie & Edmonds LLP

(57) ABSTRACT

The present invention relates to stable aqueous dispersions comprising one or a number of hydroxylated fluorinated copolymers consisting of vinylidene fluoride and/or of trifluoroethylene, of tetrafluoroethylene, of one or a number of hydroxylated allylic monomers, and optionally of one or a number of monomers chosen from non-hydroxylated vinyl ethers. The stable aqueous dispersions optionally further comprise one or a number of acrylic copolymers consisting of methyl methacrylate and of one or a number of other alkyl (meth)acrylate(s), which are optionally functionalized or substituted. The stable aqueous dispersions are prepared by dispersion in water of an organic solution of the above copolymers and then by removal of the organic solvent. They can in particular be used as binders for aqueous-phase paints or varnishes.

10 Claims, No Drawings

PAINTS COMPRISING AQUEOUS DISPERSIONS OF HYDROXYLATED FLUORINATED COPOLYMERS

FIELD OF THE INVENTION

The subject of the present invention is a stable aqueous dispersion comprising one or a number of hydroxylated fluorinated copolymers and optionally one or a number of acrylic copolymers. These dispersions have the advantage of being stable on storage, of being suitable for forming films with excellent adhesion to various substrates, and of having good chemical properties and good mechanical strength. In general they have the additional advantage of possessing a high solids content, that is to say greater than 30% by weight. These dispersions can be used as paints or coatings which can be applied in a number of ways to a variety of substrates.

BACKGROUND OF THE INVENTION

Aqueous dispersions are described in EP 212,508 and EP 224,870, assigned to Daikin, EP 341,716, assigned to Asahi Glass, and EP 508,229, assigned to Central Glass. All of these dispersions contain an alcohol and a tertiary amine, such as triethylamine. The presence of amine in a paint composition has the disadvantage of leading to yellowing of the paint during the film-forming heat treatment or even the appearance of small holes at the surface of the said paint.

EP 360,575, assigned to JSR, describes solvent-free and amine-free aqueous dispersions in the vinylidene fluoride copolymer latex form prepared as an emulsion and seeded with an acrylic copolymer with a low glass transition temperature; the main defect of these dispersions is their lack of hardness, which is particularly injurious to paint applications.

Fluorinated polymers are known for their chemical resistance, especially to solvents, their excellent thermal behavior and resistance to bad weather and to radiation, for example ultraviolet radiation, their impermeability to gases and to liquids, and their property as electrical insulators. They nevertheless have the disadvantage of being rather difficult to use, in particular for film-forming, with adhesion, transparency, and impact resistance properties which are in general inferior to other thermoplastic polymers such as polyamides.

SUMMARY OF THE INVENTION

The present invention provides a stable aqueous dispersion comprising an emulsifying agent and a hydroxylated fluorinated copolymer, wherein said hydroxylated fluorinated copolymer is the result of copolymerization of the following monomers: (a) tetrafluoroethylene, (b) a member selected from the group consisting of vinylidene fluoride, trifluoro-ethylene, and mixtures thereof, and (c) a member selected from the group consisting of allylic alcohol, allylic ethers, and mixtures thereof. The monomers are copolymerized in molar ratios such that (b)=45 to 95% of (a)+(b) and (c)=2 to 25% of (a)+(b). Optionally, the hydroxylated fluorinated copolymer may be the result of copolymerization of monomers (a), (b), and (c), and of (d) a member selected from the group consisting of nonhydroxylated vinyl ethers; fluorinated monomers other than vinylidene fluoride, trifluoroethylene, and tetrafluoroethylene; non-salified allylic ethers and esters which are optionally carboxylated and/or substituted with —$(CF_2)_n$—$CF_3$ having 4<n>10; and mixtures thereof. In this case, the monomers are copolymerized in molar ratios such that (b)=45 to 95% of (a)+(b), (c)=2 to 25% of (a)+(b), and (d)=>0 to 10% of (a)+(b).

In another aspect of the present invention, the stable aqueous dispersion may further comprise an acrylic copolymer wherein said acrylic copolymer is the result of copolymerization of the following monomers: from 40 to 70% (by mass) of methyl methacrylate; from 30 to 60% (by mass) of an alkyl (meth)acrylate, and from 0 to 15% (by mass) of a functionalized or substituted alkyl (meth)acrylate monomers. The ratio by weight of the acrylic copolymer(s) to the hydroxylated fluorinated copolymer(s) in the stable aqueous dispersion is less than 50%.

The stable aqueous dispersions according to the present invention are preferably characterized by solids contents of at least 30% by weight.

The present invention also contemplates processes for the manufacture of a stable aqueous dispersions. One such process comprises preparing a solution of hydroxylated fluorinated copolymer(s) in an organic solvent, dispersing the solution thus obtained in an aqueous solution of emulsifying agent(s), and removing the organic solvent, either simultaneously by distillation or after dispersion. Another such process comprises copolymerizing the acrylic monomers in the presence of the hydroxylated fluorinated copolymer(s) in solution or in emulsion in an organic solvent, dispersing the solution thus obtained in an aqueous solution of emulsifying agent(s), and removing the organic solvent, either simultaneously by distillation or after dispersion.

The stable aqueous dispersions of the present invention are useful for making aqueous-phase paints and varnishes.

DESCRIPTION OF THE PREFERRED EMBODIMENTS

The Hydroxylated Fluorinated Copolymers

The hydroxylated fluorinated copolymers which can be used for the aqueous dispersions according to the invention are known. They are described, for instance, in U.S. Pat. Nos. 5,231,155, 5,166,284, and 5,200,479. They derive from the following monomers:

1. from 45 to 95% (molar) of vinylidene fluoride (VF2) and/or of trifluoroethylene (VF3),
2. from 5 to 55% (molar) of tetrafluoroethylene ($C_2F_4$)
3. from 2 to 25 mol, per 100 mol of monomers 1+2, of one or a number of hydroxylated allylic monomers chosen from allylic alcohol and hydroxylated allylic ethers such as

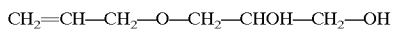

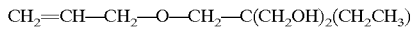

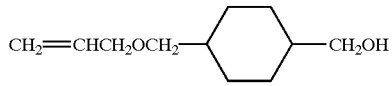

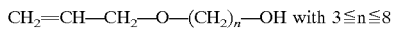

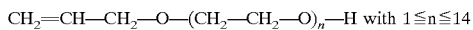

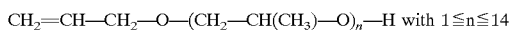

4. and from 0 to 10 mol, per 100 mol of monomers 1+2, of one or a number of monomers chosen from non-hydroxylated vinyl ethers, such as butyl vinyl ether, other fluorinated monomers (i.e., other than VF2, VF3, or $C_2F_4$), such as $C_3F_6$ or $C_2F_3Cl$, or non-salified allylic ethers and esters which are optionally carboxylated and/or substituted with —$(CF_2)_n$—$CF_3$ with $4 \leq n \geq 10$, such as:

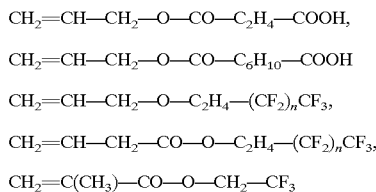

The stable aqueous dispersions contain at least 30% by weight of hydroxylated fluorinated copolymer(s).

The Acrylic Copolymers

The acrylic copolymer(s) according to the invention derive from the following monomers:

from 40 to 70% (by weight) of methyl methacrylate (MMA), from 30 to 60% (by weight) of one or a number of alkyl (meth)acrylate(s), such as butyl acrylate (BuA) or the ethyl (meth)acrylates, and from 0 to 15% (by weight) of one or a number of alkyl (meth)acrylate monomers which are functionalized or substituted, for example, with hydroxyl groups or $CF_3$—$(CF_2)_n$—groups with $4 \leq n \leq 10$, such as hydroxyethyl (meth)acrylate (HEA), 2,2,2-trifluoroethyl methacrylate (TRIFEMA), $CH_2$=$CR$—$COO$—$C_2H_4$—$(CF_2)_n$—$CF_3$ with R=H or $CH_3$ (CFnA), the (meth)acrylic acids (AA and MAA), the salts of 2-acrylamido-2-methylpropanesulphonic acid, in particular $CH_2$=$CH$—$CO$—$NH$—$C(CH_3)_2$—$CH_2$—$SO_3$—$N^+(C_2H_5)_3$ (AMPS/TEA), dimethylacrylamide (DMA) or dimethylaminoethyl methacrylate $CH_2$=$C(CH_3)$—$COO$—$CH_2$—$CH_2$—$N(CH_3)_2$ (MADAME).

The presence of some of the above monomers in the acrylic copolymer(s) improves certain mechanical, physical and/or chemical properties of the dispersion according to the invention. By way of example, hydroxy (meth)acrylates improve the crosslinking properties, TRIFEMA and the (CFnA)s have anti-graffiti properties, acrylic and methacrylic acids improve the adhesion properties, AMPS/TFA and DRA have properties of mechanical stabilization of the dispersion and MADAME makes it possible to coat substrates by cataphoresis.

The ratio by weight of the acrylic copolymer(s) to the hydroxylated fluorinated copolymer(s) and the acrylic copolymer(s) in the stable aqueous dispersion is between 0 and 50% and preferably between 20 and 30%.

Emulsions

The stability of the dispersion is provided for by one or a number of emulsifying agents present in the dispersion. Stable dispersion is understood to mean a dispersion which is stable with time, that is to say which can be used without detrimental change in its properties after prolonged storage, that is, of the order of a few months. The emulsifying agent(s) can be cationic or non-ionic but are preferably anionic. The preferred anionic emulsifiers comprise $CF_3$—$(CF_2)_n$—groups with $4 \leq n \leq 10$. Mention may be made, by way of example, of:

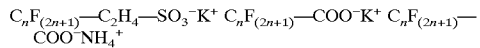

The stable aqueous dispersions generally contain from 0.5 to 3% of emulsifying agent(s).

Processes

Another subject of the invention is processes for the preparation of stable aqueous dispersions of hydroxylated fluorinated copolymers, on the one hand, and of hydroxylated fluorinated copolymers and of acrylic copolymers, on the other hand.

The literature teaches various methods for the preparation of stable aqueous dispersions. It is possible to attach carboxyl functional groups to the hydroxylated fluorinated polymer chain, either by direct copolymerization or indirectly by chemical reaction of the hydroxyl functional groups. After salification of the carboxylic acid functional groups, aqueous dispersions are obtained. See for example U.S. Pat. Nos. 5,231,155, 5,166,284, and 5,200,479. It is also possible to copolymerize fluorinated olefins with macromers having units derived from ethylene or propylene oxide, as described in EP 341,716. Using the processes set out above with the fluorinated copolymers according to the invention, satisfactory aqueous dispersions, i.e. stable and with a high solids content and free of coagulates, are not obtained.

The process for the preparation of stable aqueous dispersions developed in accordance with the present invention consists in: (a) preparing a solution of hydroxylated fluorinated copolymer(s), optionally in the presence of the acrylic copolymer(s), in an organic solvent, (b) dispersing the solution thus obtained in an aqueous solution of emulsifying agent(s), and (c) removing the organic solvent, either simultaneously by distillation or after dispersion.

The organic solution of hydroxylated fluorinated copolymer(s) alone can in general be obtained by copolymerization of these copolymers directly in solution in the organic solvent. See, for example, U.S. Pat. Nos. 5,231,155, 5,166,284, and 5,200,479. The fluorinated copolymers can be polymerized in solution, in particular in tert-butanol, methyl acetate, or isopropyl acetate. After charging the organic solvent to the polymerization reactor, the hydroxylated allylic monomer(s) and then VF2 and $C_2F_4$ are introduced. After having brought the temperature to between 50 and 70° C., the polymerization initiator, preferably chosen from isopropyl peroxydicarbonate or tert-butyl peroxypivalate, is added. During polymerization and in order to keep the proportions of the various monomers in constant ratios, VF2, $C_2F_4$, and the hydroxylated allylic monomer(s) are added while taking care to keep the pressure constant. When all the monomers have been introduced, the temperature is lowered and the reactor is degassed, the unreacted fluorinated monomers being discharged. If the solvent used during the polymerization of the fluorinated copolymers is an acetate, the organic copolymer solution is suitable for being converted into an aqueous dispersion according to the invention. In contrast, if the solvent used is tert-butanol, it is necessary to carry out a solvent transfer in order to have available fluorinated copolymer in the desired solvent.

In the case of aqueous dispersions also comprising one or a number of acrylic copolymers, it is possible to mix the previously synthesized acrylic copolymer(s) with the solution of hydroxylated fluorinated copolymer(s) or else to copolymerize the acrylic monomers, that is, the monomers from which the acrylic copolymer(s) derive(s), directly in the organic solvent in the presence of hydroxylated fluorinated copolymer(s). The copolymerization of the acrylic copolymers in the solution of hydroxylated fluorinated copolymer(s) can be carried out by adding the entirety or a fraction of the acrylic monomers, which is introduced either continuously or by successive increments during polymerization. The polymerization temperature is in general between 40 and 90° C. It is possible to use transfer agents of mercaptan type in order to reduce the molecular masses and organosoluble radical initiators in general chosen from initiators of azo, peroxydicarbonate, peroxypivalate, and diacyl peroxide type. Mention may be made, as example, of azobisisobutyronitrile, cyclohexyl peroxydicarbonate, or tert-butyl peroxypivalate.

In the case of the aqueous dispersions also comprising one or a number of acrylic copolymers, a variant consists in using the seeded emulsion polymerization technique, such as described in EP 320,126 and EP 360,575, which consists in carrying out an emulsion polymerization of the mixture of acrylic monomers in the presence of hydroxylated fluorinated copolymer latex/latices or of an artificial dispersion of hydroxylated fluorinated copolymer(s).

The organic solvents according to the invention have a boiling point in general of between 30 and 90° C. and a solubility in water of in general between 0.5 and 500 g/l (measured at 20° C., NTP conditions). Mention may be made of alcohols or esters, the latter being particularly preferred. As an example of preferred solvent, it is possible to use alkyl acetates (methyl acetate, ethyl acetate, and isopropyl acetate, and the like).

The concentration by weight of the hydroxylated fluorinated copolymer(s) in the organic solvent is in general between 15 and 40%.

Dispersion of the copolymers can be carried out using dispersers or homogenizers capable of dispelling a great deal of mechanical energy into the mixtures of immiscible liquids. These devices make it possible to produce emulsions of "oil-in-water" type by virtue of the addition of appropriate emulsifying agent(s), the "oil" phase being in this instance the organic solution of hydroxylated fluorinated copolymer (s). The aqueous solution/copolymer solution mixture is subjected to intense shearing by a mechanical stirring system or else by passing under pressure through nozzles. In general, the dispersion stage can be carried out within a temperature range of between 0 and 100° C. and preferably between 15 and 50° C.

The water/copolymer solution ratio by weight is in general between 0.2 and 1.

Properties and Use

After removal of the organic solvent, an aqueous dispersion is obtained which is stable on prolonged storage and which can be used several months after its manufacture without lessening of its properties. The mechanical stability on storage of the aqueous dispersion can be assessed by carrying out, on the one hand, a sedimentation test and, on the other hand, by measuring the size of the dispersed particles.

The sedimentation test consists in leaving the dispersion to stand for a month and in then evaluating any deposit formed after brief stirring followed by standing for 24 hours. The ratio by weight of deposited and dried copolymers to the total amount of dried copolymers present is calculated.

The size of the particles is measured by analysis of the scattering of a monochromatic beam through a dilute sample of the dispersion.

Another subject of the invention is the use of the aqueous dispersions as binders for water paints. Water paints have become widely used in recent years due in particular to their ease of use (light equipment not requiring a system for removing the solvents, easy cleaning of the equipment) and to a collective awareness of the problems of pollution of the environment. While the base constituents of paints, such as fluorinated polymers and acrylic polymers, are often soluble in organic solvents of ester or ketone type, they are in general insoluble or virtually insoluble in water. There has therefore been a search to emulsify or disperse these essential constituents of paints so as to be able to use them in the aqueous phase.

In addition to the dispersions according to the invention, aqueous-phase paint binders comprise one or a number of hardeners which are in general resins carrying functional groups capable of chemically reacting with the hydroxyl groups of the dispersed copolymers. Mention may be made, among hardeners which can be used in the context of the invention, of blocked or free polyisocyanate resins, it being necessary for the latter to be subjected to a pretreatment which makes it possible for them to be emulsified in water, or melamine/formaldehyde or urea/formaldehyde resins.

The paints can also contain one or a number of pigments which can be of inorganic or organic type. It is preferable, in general, to use inorganic pigments, among which mention may be made of titanium dioxide, iron or chromium oxides, mixed cobalt and aluminum oxides, carbon black, molybdate orange, corrosion-inhibitor pigments, such as zinc phosphate, or metallic pigments, such as aluminum.

The aqueous paints can also contain a small amount of solvent for the hydroxylated fluorinated copolymer(s), in order to improve the film formation thereof. Mention may be made, as example, of alcohols, ethers or ethers of glycol or of propylene glycol.

It is also possible to add, to the paint, any conventional adjuvant or additive for varnishes and paints, such as dispersing agents, thickeners of associative or non-associative type, agents intended to promote spreading, rheology-modifying agents, heat-stabilizing and/or ultraviolet-stabilizing agents, antioxidants, anti-foaming agents, wetting agents for pigments and/or vehicles, fungicides, bactericides, antifreezes, catalysts of the hardening reaction of the paint, and the like.

The paint is prepared in a way known per se by mixing the various constituents. In general, the pigment(s) is/are dispersed in water, in the optional presence of dispersant(s), and then mixing is carried out at high speed until a dispersion having the required fineness is obtained. The preparation can be carried out in a disperser-type device where the liquids to be mixed are subjected to a high degree of shearing due to the intense stirring (Ultra-Turrax® device). It is also possible to obtain shearing by pumping the mixture of liquids to be dispersed through calibrated nozzles (Manton-Gaulin device). It is also possible to disperse the liquids efficiently in an ultrasonic vessel of high frequency. Mention may also be made of electric dispersers where one of the phases to be dispersed is passed through a capillary placed in an electric field which disperses it in the form of fine droplets. The additive(s) listed above is/are then introduced with stirring, followed by the stable aqueous dispersion. Depending on the nature of the hardener, it is added either at the end of mixing or immediately before use of the paint. When the hardener, for example a polyisocyanate, is introduced at the end of mixing, it is preferable to disperse it beforehand in water before introducing it into the mixture, in order to provide it with a better subsequent distribution in the mixture. The predispersion of the hardener is further improved by diluting it beforehand in a solvent so as to decrease the viscosity and promote emulsification. Mention may be made, among the solvents which can be used, of esters, ether esters or aromatic compounds. Solvents of low solubility are preferred because they are, in general, less liable to destabilize the emulsion of fluorinated copolymers. Solvent of low solubility in water is understood to mean solvents whose solubility in water is less than 30% by weight.

The paints according to the invention can be applied to the substrates to be coated according to any known technique such as compressed-air spray gun, electrostatic, brush, roller, by curtain-coating, by dipping, or by electrodeposition.

The substrates to be coated can be metals, such as steel, galvanized steel, aluminum, and the like, plastics, such as poly(vinyl chloride), polyesters, or phenolic resins, glass, ceramics, wood or concrete. Said substrates may optionally be coated with primer and/or be subjected to a surface treatment intended to promote adhesion of the paint.

EXAMPLES

In all the examples, the solids content (SC) is expressed in % by weight.

Examples 1 to 11

Manufacture of Aqueous Dispersions Containing Hydroxylated Fluorinated Copolymers

| Starting copolymers Ai and Cj | Molar compositions (The molar proportions of the monomers, other than VF2 and $C_2F_4$, are indicated with respect to 100 mol of VF2 + $C_2F_4$.) |
|---|---|
| According to the invention Ai | |
| A1 VF2/$C_2F_4$/$CH_2$=CH—$CH_2$—O—$CH_2$CHOH—$CH_2$OH | 65/35/10 |
| A2 VF2/$C_2F_4$/$CH_2$=CH—$CH_2$—O—$(CH_2)_4$—OH | 65/35/10 |
| A3 VF3/$C_2F_4$/$CH_2$=CH—$CH_2$—O—$CH_2$CHOH—$CH_2$OH | 50/50/10 |
| A4 VF2/$C_2F_4$/$CH_2$=CH—$CH_2$—O—CO—$C_6H_{10}$—COOH/ $CH_2$=CH—$CH_2$—O—$CH_2$—CHOH—$CH_2$OH | 50/50/2/10 |
| A5 VF2/$C_2F_4$/$C_3F_6$/$CH_2$=CH—$CH_2$—O—$CH_2$—CHOH—$CH_2$OH | 65/35/7/10 |
| Comparatives Cj | |
| C1 VF2/$C_2F_4$/$C_3F_6$ | 78/22/7.5 |
| C2 VF2/$C_2F_4$/$CH_2$=CH—O—$C_4H_9$ | 65/35/10 |
| C3 VF2/$C_2F_4$/$CH_2$=CH—$CH_2$—O—CO—$C_6H_{10}$—COOH | 65/35/10 |
| Aqueous solution: 150 g of deionized water containing 0.75 g of emulsifier | |
| Copolymer solution: 315 g of a solution of the copolymer Ai or Cj containing 23.8% of solids in the organic solvent. | |

The characteristics of the copolymers Ai and Cj are indicated hereinbelow.

The aqueous emulsifier solution is introduced into a 1 liter beaker. This solution is stirred with an Ultra-Turrax® disperser for a few seconds. The copolymer solution is then introduced over 5 minutes at a mean stirring speed of 6000 rev/min. Stirring is continued for a further 1 minute at 10,000 rev/min and then stirring is halted. The dispersion is transferred into a 1 liter stirred reactor in which the solvent is removed by distillation under vacuum at T≦50° C. No deposit or crust is formed during this operation for the copolymers Ai. The dispersion is drained off. The solids content (SC) of the aqueous dispersion and the size of the particles (mean diameter) are calculated and the deposit formed after storing for 1 month is measured (gentle stirring is resumed and the dispersion is again left to settle).

TABLE 1

| Example | Co-polymer | Solvent | Emulsifier % with respect to the copolymer Ai | % SC dispersion | Particle size nm | Stability of the dispersion. Degree of deposition % |
|---|---|---|---|---|---|---|
| 1 | A1 | Methyl acetate | $C_6F_{13}C_2H_4SO_3K$ 1% | 33 | 300 | 0 |
| 2 | A4 | Methyl acetate | $C_8F_{17}C_2H_4SO_3K$ 1% | 30 | 320 | 3 |
| 3 | A3 | Methyl acetate | $C_8F_{17}C_2H_4SO_3K$ 1% | 33 | 300 | 3 |
| 4 | A4 | Methyl acetate | $C_8F_{17}C_2H_4SO_3K$ 1% | 30 | 320 | 5 |
| 5 | A5 | Isopropyl acetate | $C_8F_{17}C_2H_4SO_3K$ 1% | 30 | 350 | 10 |
| 6 | A4 | Methyl acetate | $C_6F_{13}COONH_4$ 1% | 30 | 350 | 15 |
| 7 | A4 | Methyl acetate | Na dodecyl-benzene-sulphonate 1% | 30 | 350 | 20 |
| 8 | A1 | Acetonitrile | $C_8F_{17}C_2H_4SO_3K$ 1% | 2%⊛ | | 90%⊛ |
| 9 | C1 | Methyl acetate | $C_8F_{17}C_2H_4SO_3K$ 1% | 1%⊛ | | 95%⊛ |
| 10 | C2 | Methyl acetate | $C_8F_{17}C_2H_4SO_3K$ 1% | 2%⊛ | | 90%⊛ |
| 11 | C3 | Methyl acetate | $C_8F_{17}C_2H_4SO_3K$ 1% | 5% | Not measurable | 80%⊛ |

Note to Table 1:
⊛ Separation by settling is very fast and the deposits cannot be redispersed; given that formation of the deposits is significant, the solids content of the dispersion after 24 hours of sedimentation is low.

According to processes as described in EP 212,508, EP 281,991, and EP 320,156, and EP 508,229, the preparation was also carried out of a 50% by weight solution in acetone of a copolymer A, containing VF2/$C_2F_4$/$CH_2$=CH—$CH_2$—O—CO—$C_6H_{10}$—COOH/$CH_2$=CH—$CH_2$—O—$CH_2$—CHOH—$CH_2$OH units in the molar proportions 65/35/4/10, where Mn=9000 and Mw=18,500, neutralized to 100% with triethylamine. Deionized water is added until the solids content is 20% and the acetone is then removed under vacuum at 40° C. It is observed that the dispersion loses its stability. A polymer mass is formed which cannot be redispersed in water.

Aqueous Dispersions Containing Hydroxylated Fluorinated Copolymers and Acrylic Copolymers Starting fluorinated copolymers: Ai
Preparation of the Acrylic Copolymers ACRYL k
ACRYL 1 MMA/BUA/HEA copolymer prepared in solution in methyl acetate without the fluorinated copolymer. 350 g of methyl acetate and 2.5 g of cyclohexyl peroxydicarbonate are introduced into a 2 1 round-bottomed flask equipped with a double jacket, a stirrer and a condenser. After deaeration, the temperature is brought to 50° C. and the mixture of the following acrylic monomers is introduced:

| methyl methacrylate | 75 g |
|---|---|
| butyl acrylate | 75 g |
| hydroxyethyl acrylate | 4.5 g |

The mixture is run in over 1 hour and the polymerization is then continued for a further 3 hours. A solution of acrylic copolymer in butyl acetate with a solids content of 27% is recovered. The composition by weight of the MMA/BUA/HEA copolymer is 48.5/48.5/3

ACRYL 2 MMA/BuA/AMPS copolymer prepared in methyl acetate 300 g of methyl acetate, 65 g of methyl methacrylate, 65 g of butyl acrylate and a solution consisting of 20 g of AMPS, neutralized with 9.76 g of triethylamine, in 60 g of methyl acetate are introduced into a 2 l reactor equipped with a double jacket, a stirrer and a condenser. After deaeration, the temperature is brought to 50° C. and 2.5 g of cyclohexyl peroxydicarbonate are added. Polymerization is maintained for 4 h at 50° C. 503 g of solution with a solids content of 30.9% are recovered. The composition by weight of the MKA/BUA/AMPS copolymer is 43.3/43.3/13.4.

persed. The solids content is 30.7%. The fluorinated copolymer/acrylic copolymer ratio is 25%. The composition by weight of the MMA/BuA/HEA/DMA acrylic copolymer is 47.5/47.5/3/2.

Preparation of a Solution Containing the Acrylic Copolymer and the Fluorinated Copolymer by Mixing (Solutions F/A2 to F/A6)

The fluorinated copolymer, with a solids content of 25%, and the acrylic copolymer ACRYL k (k=1 to 3) are simply mixed so as to have acrylic copolymer levels of the order of 30% by weight. The details appear in Table 2.

TABLE 2

| | Fluorinated copolymer | | | | Acrylic copolymers | | | % Acrylic copolymer/ | |
|---|---|---|---|---|---|---|---|---|---|
| No. | Ref. | SC % | Weight (g) | Solvent | Ref. | SC % | Weight (g) | (acrylic + fluorinated) copolymers | SC % of the dispersion |
| F/A2 | A1 | 25 | 300 | methyl acetate | ACRYL 1 | 27% | 118.5 | 30 | 25.6 |
| F/A3 | A4 | 25 | 300 | methyl acetate | ACRYL 1 | 27% | 118.5 | 30 | 25.6 |
| F/A4 | A1 | 25 | 300 | methyl acetate | ACRYL 2 | 30.9 | 103.5 | 30 | 26.5 |
| F/A5 | A1 | 25 | 300 | methyl acetate | ACRYL 3 | 29.4 | 109 | 30 | 26.2 |
| F/A6 | A3 | 25 | 300 | methyl acetate | ACRYL 1 | 27% | 118.5 | 30 | 25.6 |

ACRYL 3 MKA/BuA/HEA/MADAME copolymer, 67.5/67.5/5/10, prepared in methyl acetate. 365 g of isopropyl acetate and 2.5 g of azobisisobutyronitrile are introduced into a 2 l reactor equipped with a double jacket, a stirrer and a condenser. After deaeration, the temperature is brought to 70° C. and the mixture of the following monomers is introduced:

| methyl methacrylate | 67.5 g |
|---|---|
| butyl acrylate | 67.5 g |
| hydroxyethyl acrylate | 5 g |
| MADAME | 10 g |

The mixture is run in over 1 h and the polymerization is continued for a further 3 h. An acrylic copolymer solution with a solids content of 29.4% is recovered. The composition by weight of the MMA/BuA/HEA/MADAME acrylic copolymer is 45/45/3.3/6.7.

Solution of Fluorinated Copolymer and of Acrylic Copolymer

Preparation of Acrylic Copolymer in the Presence of the Fluorinated Copolymer 600 g of a solution of copolymer A1, with a solids content of 25%, in methyl acetate, and 1.8 g of cyclohexyl peroxydicarbonate, are introduced into a 2 l round-bottomed flask equipped with a stirrer, a double jacket and a condenser. After removing atmospheric oxygen, the temperature is brought to 50° C. The introduction of the mixture of following acrylic monomers is begun at this temperature:

| methyl methacrylate | 23.7 g |
|---|---|
| butyl acrylate | 23.7 g |
| hydroxyethyl acrylate | 1.5 g |
| dimethylacrylamide | 1 g |

This mixture is introduced steadily over 1 hour. After polymerizing for 3 h at 50° C., the reactor is cooled. The F/A1 solution is drained off and is then ready to be dis- Examples 12 to 17

Aqueous Dispersions Containing Fluorinated Copolymers and Acrylic Copolymers

Using the procedure described in Examples 1 to 11, 315 g of a solution of fluorinated copolymer and of acrylic copolymer are dispersed with the disperser with deionized water containing 0.75 g of emulsifier of formula $C_nF_{2n+1}C_2H_4SO_3K$ (n=4 to 10); the acetate solvent is then removed by distillation under vacuum.

TABLE 3

| Example No. | Solvent | Water | Ref. solution | SC % aqueous dispersion | Size of the particles nm | Dispersion stability. Degree of deposition %/dry copolymer |
|---|---|---|---|---|---|---|
| 12 | Methyl acetate | 150 g | F/A1 Sol | 37% | 300 | Stable 2% |
| 13 | Methyl acetate | 150 g | F/A2 Sol | 41% | 290 | Stable 1% |
| 14 | Methyl acetate | 150 g | F/A3 Sol | 35% | 320 | Stable 2% |
| 15 | Methyl acetate | 225 g | F/A4 Sol | 31% | 250 | Very stable 0% |
| 16 | Isopropyl acetate | 225 g | F/A5 Sol | 30% | 310 | Stable 5% |
| 17 | Methyl acetate | 225 g | F/A6 Sol | 39% | 300 | Stable 2% |

Examples 18 to 26

Aqueous-Phase Paints

Example 18

A varnish is prepared in the following way:
The following are introduced into a 1 liter beaker:
2.4 g of a modified alkyl polyalkoxy ether in paraffinic anti-foaming agent (viscosity 200 mPa's);

0.7 g of a solution of N,N'-dihydroxymethylurea, 1,6-dihydroxy-2,5-dioxohexane, and of an isothiazolinone bactericidal agent;

10 g of butyl diglycol acetate; and 500 g of the fluorinated copolymer emulsion of Example 1.

The ingredients are then mixed at 500 rev/min for 1 minute to prepare an emulsion.

An isocyanate predispersion is prepared separately in a 500 ml beaker by successively introducing:

100 g of a hydrophilic aliphatic polyisocyanate based on hexamethylene diisocyanate hardener (content of free NCO groups: 17.2%, viscosity at 23° C.: 3500 mpa's); and 122.2 g of water.

Vigorous mixing is carried out at 500 rev/min for 1 minute.

178.9 g of this isocyanate predispersion are then introduced into the above emulsion and stirring is carried out at 500 rev/min for 1 minute in order to obtain the varnish.

This varnish is applied with a 100 μM spiral doctor blade to a plate of chromated aluminum, which has been degreased beforehand, and then stoved for 30 minutes at 80° C. to give a film with a dry thickness of 16 μm. The Persoz hardness, measured according to NFT Standard 30-016, is 220 s. The specular gloss at 60° C., measured according to ASTM D 523-85, is 65%. The adhesion, evaluated according to NFT Standard 30-038, is Class 1. The resistance to methyl ethyl ketone is greater than 100 to-and-from movements.

In order to estimate the degree of crosslinking of the film, it is subjected to a series of rubbing movements with a cotton-wool swab impregnated with methyl ethyl ketone, until the substrate appears. A number of to-and-fro movements of less than 50 indicates poor crosslinking and a number greater than 100 indicates excellent crosslinking.

Example 19

A white paint is prepared in the following way:

90 g of water and 1.8 g of a sodium polyacrylate pigment dispersion agent are introduced into a 1 liter beaker, mixing is carried out, and then 171.9 g of titanium dioxide are added. Dispersion is carried out at 2000 rev/min for 15 minutes until a fineness of less than 10 pm is obtained.

The following are then introduced:

3 g of a modified alkyl polyalkoxy ether in paraffinic anti-foaming agent (viscosity 200 mpa's);

0.8 g of a solution of N,N'-dihydroxymethylurea, 1,6-dihydroxy-2,5-dioxohexane, and of an isothiazolinone bactericidal agent;

10 g of butyl diglycol acetate; and 500 g of the fluorinated copolymer emulsion of Example 1.

Mixing is then carried out at 500 rev/min for 2 minutes in order to obtain a pigmented fluorinated emulsion.

The isocyanate predispersion is prepared separately in a 500 ml beaker by successively introducing:

100 g of a hydrophilic aliphatic polyisocyanate based on hexamethylene diisocyanate hardener (content of free NCO groups: 17.2%, viscosity at 23° C.: 3500 mpa's);

30 g of methoxypropyl acetate; and 92.2 g of water.

Vigorous mixing is carried out at 500 rev/min for 1 minute.

178.9 g of this isocyanate predispersion are then introduced into the pigmented fluorinated emulsion and stirring is carried out at 500 rev/min for 1 minute in order to obtain the paint.

This paint is applied with a 120 μm spiral doctor blade to a plate of chromated aluminum, which has been degreased beforehand, and then stoved for 30 minutes at 80° C. to give a film with a dry thickness of 18 μM. The Persoz hardness, measured according to NFT Standard 30-016, is 220 a. The specular gloss at 60°, measured according to ASTM Standard D 523-85, is 30%. The resistance to methyl ethyl ketone is greater than 100 to-and-fro movements. The adhesion, evaluated according to NFT Standard 30-038, is Class 0.

Example 20

A white paint is prepared in the following way:

80 g of water and 1.6 g of a sodium polyacrylate pigment dispersion agent are introduced into a 1 liter beaker, mixing is carried out and then 150 g of titanium dioxide are added. Dispersion is carried out at 2000 rev/min for 15 minutes until a fineness of less than 10 PM is obtained.

The following are then introduced:

2.8 g of a modified alkyl polyalkoxy ether in paraffinic anti-foaming agent (viscosity 200 mpa's);

0.7 g of a solution of N,N'-dihydroxymethylurea, 1,6-dihydroxy-2,5-dioxohexane, and of an isothiazolinone bactericidal agent;

10 g of butyl diglycol acetate; and 500 g of the fluorinated copolymer emulsion of Example 2.

Mixing is carried out at 500 rev/min for 2 minutes in order to obtain a pigmented fluorinated emulsion.

The isocyanate predispersion is prepared separately in a 500 ml beaker by successively introducing:

100 g of a hydrophilic aliphatic polyisocyanate based on hexamethylene diisocyanate hardener (content of free NCO groups: 17.2%, viscosity at 23° C.: 3500 mPa's);

30 g of methoxypropyl acetate; and 92.2 g of water.

Vigorous mixing is carried out at 500 rev/min for 1 minute.

143.1 g of this isocyanate predispersion are then introduced into the pigmented fluorinated emulsion and stirring is carried out at 500 rev/min for 1 minute in order to obtain the paint.

This paint is applied with a 120 μm spiral doctor blade to a plate of galvanized steel with a thickness of 0.8 mm, which has been degreased beforehand and covered with a primer of epoxy type, and then stoved for 15 minutes at 180° C. to give a film with a dry thickness of 17 PM. The Persoz hardness, measured according to NFT Standard 30-016, is 245 s. The specular gloss at 60° C., measured according to ASTM Standard D 523-85, is 38%. The resistance to methyl ethyl ketone is greater than 100 to-and-fro movements. The adhesion, evaluated according to NFT Standard 30-038, is Class 0.

Example 21

A varnish is prepared in the following way:

The following are introduced into a 1 liter beaker:

2.5 g of a modified alkyl polyalkoxy ether in paraffinic anti-foaming agent (viscosity 200 mpa's);

0.7 g of a solution of N,N'-dihydroxymethylurea, 1,6-dihydroxy-2,5-dioxohexane, and of an isothiazolinone bactericidal agent;

10 g of butyl diglycol acetate; and 500 g of the fluorinated copolymer emulsion of Example 12.

Mixing is carried out at 500 rev/min for 1 minute.

The isocyanate predispersion is prepared separately in a 500 ml beaker by successively introducing:

100 g of the hydrophilic aliphatic polyisocyanate based on hexamethylene diisocyanate hardener (content of free NCO groups: 17.2%, viscosity 23° C.: 3500 mpa's); and 122.2 g of water.

Vigorous mixing is carried out at 500 rev/min for 1 minute.

149.6 g of this isocyanate predispersion are then introduced into the above emulsion and stirring is carried out at 500 rev/min for 1 minute in order to obtain the varnish.

This varnish is applied with a 100 μm spiral doctor blade to a plate of chromated aluminum, which has been degreased beforehand, and then stoved for 30 minutes at 80° C. to give a film with a dry thickness of 18 μm. The Persoz hardness, measured according to NFT Standard 30-016, is 260 s. The specular gloss at 600, measured according to ASTM Standard D 523-85, is 60%. The resistance to methyl ethyl ketone is greater than 100 to-and-fro movements. The adhesion, evaluated according to NFT Standard 30-038, is Class 0.

Example 22

A white paint is prepared in the-following way:

100 g of water and 1.9 g of a sodium polyacrylate pigment dispersion agent are introduced into a 1 liter beaker, mixing is carried out and then 194.6 g of titanium dioxide are added. Dispersion is carried out at 2000 rev/min for 15 minutes until a fineness of less than 10 pm is obtained.

The following are then introduced:

2.5 g of a modified alkyl polyalkoxy ether in paraffinic anti-foaming agent (viscosity 200 mpa's);

0.7 g of a solution of N,N'-dihydroxymethylurea, 1,6-dihydroxy-2,5-dioxohexane, and of an isothiazolinone bactericidal agent;

10 g of butyl diglycol acetate; and 500 g of the fluorinated copolymer emulsion of Example 13.

Mixing is carried out at 500 rev/min for 2 minutes in order to obtain a pigmented fluorinated emulsion.

The isocyanate predispersion is prepared separately in a 500 ml beaker by successively introducing:

100 g of a hydrophilic aliphatic polyisocyanate based on hexamethylene diisocyanate hardener (content of free NCO groups: 17.2%, viscosity at 23° C.: 3500 mpa's);

30 g of methoxypropyl acetate; and 92.2 g of water.

Vigorous mixing is carried out at 500 rev/min for 1 minute.

162.3 g of this isocyanate predispersion are then introduced into the pigmented fluorinated emulsion and stirring is carried out at 500 rev/min for 1 minute in order to obtain the paint.

This paint is applied with a 100 μm spiral doctor blade to a plate of chromated aluminum, which has been degreased beforehand, and then stoved for 40 minutes at 800° C. to give a film with a dry thickness of 20 μM. The Persoz hardness, measured according to NFT Standard 30-016, is 235 s. The specular gloss at 60°, measured according to ASTM Standard D 523-85, is 39%. The resistance to methyl ethyl ketone is greater than 100 to-and-fro movements. The adhesion, evaluated according to NFT Standard 30-038, is Class 0.

Example 23

A white paint is prepared in the following way:

75 g of water and 1.6 g of a sodium polyacrylate pigment dispersion agent are introduced into a 1 liter beaker, mixing is carried out and then 141.5 g of titanium dioxide are added. Dispersion is carried out at 2000 rev/min for 15 minutes until a fineness of less than 10 μm is obtained.

The following are then introduced:

2.8 g of a modified alkyl polyalkoxy ether in paraffinic anti-foaming agent (viscosity 200 mpa's);

0.7 g of a solution of N,N'-dihydroxymethylurea, 1,6-dihydroxy-2,5-dioxohexane, and of an isothiazolinone bactericidal agent;

10 g of butyl diglycol acetate; and 500 g of the fluorinated copolymer emulsion of Example 15.

Mixing is carried out at 500 rev/min for 2 minutes in order to obtain a pigmented fluorinated emulsion.

The isocyanate predispersion is prepared separately in a 500 ml beaker by successively introducing:

100 g of a hydrophilic aliphatic polyisocyanate based on hexamethylene diisocyanate hardener (content of free NCO groups: 17.2%, viscosity at 23° C.: 3500 mpa's);

30 g of methoxypropyl acetate; and 92.2 g of water.

Vigorous mixing is carried out at 500 rev/min for 1 minute.

104.7 g of this isocyanate predispersion are then introduced into the pigmented fluorinated emulsion and stirring is carried out at 500 rev/min for 1 minute in order to obtain the paint.

This paint is applied with a 120 pm spiral doctor blade to a plate of chromated aluminum, which has been degreased beforehand, and then stoved for 30 minutes at 800° C. to give a film with a dry thickness of 20 μm. The Persoz hardness, measured according to NFT Standard 30-016, is 200 s. The specular gloss at 600, measured according to ASTM Standard D 523-85, is 28%. The resistance to methyl ethyl ketone is greater than 100 to-and-fro movements. The adhesion, evaluated according to NFT Standard 30-038, is Class 0.

Example 24

A white paint is prepared in the following way:

75 g of water and 1.6 g of a sodium polyacrylate pigment dispersion agent are introduced into a 1 liter beaker, mixing is carried out and then 142.7 g of titanium dioxide are added. Dispersion is carried out at 2000 rev/min for 15 minutes until a fineness of less than 10 M is obtained.

The following are then introduced:

2.8 g of a modified alkyl polyalkoxy ether in paraffinic anti-foaming agent (viscosity 200 mpa's);

0.7 g of a solution of N,N'-dihydroxymethylurea, 1,6-dihydroxy-2,5-dioxohexane, and of an isothiazolinone bactericidal agent;

9 g of butyl diglycol acetate; and 500 g of the fluorinated copolymer emulsion of Example 13.

Mixing is carried out at 500 rev/min for 2 minutes in order to obtain a pigmented fluorinated emulsion.

The isocyanate predispersion is prepared separately in a 500 ml beaker by successively introducing:

100 g of a hydrophilic aliphatic polyisocyanate based on hexamethylene diisocyanate hardener (content of free NCO groups: 17.2%, viscosity at 23° C.: 3500 mpa's);

20 g of propylene glycol diacetate; and 102.2 g of water.

Vigorous mixing is carried out at 500 rev/min for 1 minute.

119.6 g of this isocyanate predispersion are then introduced into the pigmented fluorinated emulsion and stirring is carried out at 500 rev/min for 1 minute in order to obtain the paint.

This paint is applied with a 120 μm spiral doctor blade to a plate of chromated aluminum, which has been degreased beforehand, and then stoved for 30 minutes at 120° C. to give a film with a dry thickness of 18 μm. The Persoz hardness, measured according to NFT Standard 30-016, is 230 s. The specular gloss at 600, measured according to ASTM Standard D 523-85, is 33%. The resistance to methyl ethyl ketone is greater than 100 to-and-fro movements. The adhesion, evaluated according to NFT Standard 30-038, is Class 0.

Example 25

A varnish is prepared in the following way:

500 g of fluorinated copolymer of Example 1 are introduced into a 1 liter beaker, followed by the addition of 210 g of a 10% solution of oxyethylenated alkylphenol surface-active agent in water. Mixing is carried out at 500 rev/min for 1 minute.

12 g of a polyurethane associative thickener are added to this dispersion, vigorous mixing is carried out at 500 rev/min for 1 minute, and then 47.5 g of a hydrophilic aliphatic polyisocyanate based on hexamethylene diisocyanate hardener (content of free NCO groups: 17.2%, viscosity at 23° C.: 3500 mpa's) are introduced dropwise into the dispersion with stirring at 1000 rev/min for 1 minute in order to obtain the varnish.

This varnish is applied with a 100 μm spiral doctor blade to a plate of chromated aluminum, which has been degreased beforehand, and then stoved for 1 hour at 80° C. to give a film with a dry thickness of 20 μm. The Persoz hardness, measured according to NFT Standard 30-016, is 215 s. The specular gloss at 600, measured according to ASTM Standard D 523-85, is 70%. The adhesion, evaluated according to NFT Standard 30-038, is Class 1. The resistance to methyl ethyl ketone is greater than 200 to-and-fro movements.

Example 26

A paint is prepared in the following way:

280 g of water and 0.69 g of a sodium polyacrylate ④ are introduced into a 1 liter beaker, mixing is carried out and then 138.25 g of titanium dioxide are added. Dispersion is carried out at 2000 rev/min for 20 minutes until a fineness of less than 10 μM is obtained.

The following are then introduced:

210 g of a 10% solution of oxyethylenated alkylphenol surface-active agent in water;

3 g of a modified siloxane copolymer anti-foaming agent;

0.8 g of a solution of N,N'-dihydroxymethylurea, 1,6-dihydroxy-2,5-dioxohexane, and of an isothiazolinone bactericidal agent;

500 g of the copolymer dispersion of Example 1; and 12 g of a polyurethane associative thickener.

Vigorous mixing is carried out at 500 rev/min for 2 minutes in order to obtain a pigmented fluorinated emulsion. 47.5 g of a hydrophilic aliphatic polyisocyanate based on hexamethylene diisocyanate hardener (content of free NCO groups: 17.2%, viscosity at 23° C.: 3500 mpa's) are then introduced dropwise into the dispersion with stirring at 1000 rev/min for 1 minute in order to obtain the paint.

This paint is applied with a 100 μm spiral doctor blade to a plate of chromated aluminum, which has been degreased beforehand, and then stoved for 1 hour at 80° C. to give a film with a dry thickness of 30 μm. The Persoz hardness, measured according to NFT Standard 30-016, is 200 s. The specular gloss at 60°, measured according to ASTM D 523-85, is 40%. The adhesion, evaluated according to NFT Standard 30-038, is Class 1. The resistance to methyl ethyl ketone is 100 to-and-fro movements.

What is claimed is:

1. A stable aqueous dispersion comprising an emulsifying agent and a hydroxylated fluorinated copolymer, wherein said hydroxylated fluorinated copolymer is the result of copolymerization of the following monomers:

(a) tetrafluoroethylene, (b) a member selected from the group consisting of vinylidene fluoride, trifluoroethylene, and mixtures thereof, and (c) a member selected from the group consisting of allylic alcohol, allylic ethers, and mixtures thereof, in molar ratios such that (b)=45 to 95% of (a)+(b) and (c)=2 to 25% of (a)+(b).

2. The stable aqueous dispersion of claim 1 wherein (c) is selected from the group consisting of

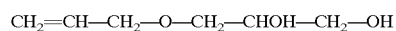

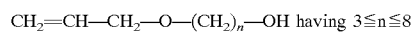

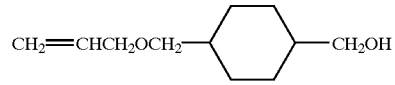

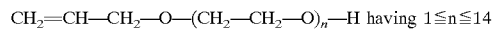

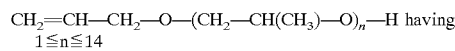

and mixtures thereof.

3. The stable aqueous dispersion of claim 1 wherein said hydroxylated fluorinated copolymer is the result of copolymerization of the monomers recited in claim 1 and of (d) a member selected from the group consisting of nonhydroxylated vinyl ethers; fluorinated monomers other than vinylidene fluoride, trifluoroethylene, and tetrafluoroethylene; non-salified allylic ethers and esters which are optionally carboxylated and/or substituted with —$(CF_2)_n$—$CF_3$ having $4 \leq n \leq 10$; and mixtures thereof, in molar ratios such that (b)=45 to 95% of (a)+(b), (c)=2 to 25% of (a)+(b), and (d)=>0 to 10% of (a)+(b).

4. The stable aqueous dispersion of claim 3 wherein (d) is selected from the group consisting of butyl vinyl ether

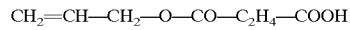

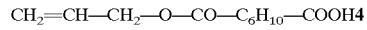

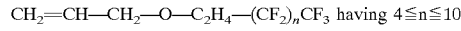

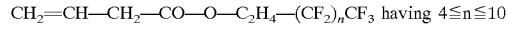

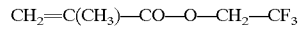

and mixtures thereof.

5. The stable aqueous dispersion of claim 1, further comprising an acrylic copolymer wherein said acrylic copolymer is the result of copolymerization of the following monomers:

from 40 to 70% (by mass) of methyl methacrylate;

from 30 to 60% (by mass) of an alkyl (meth)acrylate; and from 0 to 15% (by mass) of a functionalized or substituted alkyl (meth)acrylate monomer or monomers, wherein said functionalized or substituted monomer or monomers are functionalized or substituted with functionality selected from the group consisting of hydroxyl, $CF_3-(CF_2)_n$ with $4 \leq n \leq 10$, carboxyl, salts of carboxyl, sulfonic acid, and amide; and wherein the ratio by weight of the acrylic copolymer to the hydroxylated fluorinated copolymer in the stable aqueous dispersion is less than 0.5.

6. The stable aqueous dispersion of claim 5, wherein said alkyl (meth)acrylate is selected from the group consisting of butyl acrylate, ethyl acrylate, ethyl (meth)acrylate, and mixtures thereof, said functionalized or substituted alkyl (meth)acrylate monomers are functionalized or substituted with hydroxyl groups or $CF_3-(CF_2)_n-$ groups having $4 \leq n \leq 10$, and the ratio by weight of the acrylic copolymer(s) to the hydroxylated fluorinated copolymer(s) in the stable aqueous dispersion is between 20 and 30%.

7. The stable aqueous dispersion according to any one of claims 1 to 6, characterized in that its solids content is at least 30% by weight.

8. An aqueous-phase paint or varnish which comprises a stable aqueous dispersion in accordance with any one of claims 1–6.

9. An aqueous-phase paint or varnish which comprises a stable aqueous dispersion in accordance with claim 7.

10. The stable aqueous dispersion of claim 5, wherein the functionalized or substituted monomer or monomers are selected from the group consisting of hydroxyethyl (meth)acrylate (HEA), 2,2,2-trifluoroethyl methacrylate (TRIFEMA), $CH_2=CRCOO-C_2H_4-(CF_2)_n-CF_3$ (with R=H or $CH_3-CF_n$, $3 \leq n \leq 8$), (meth)acrylic acids (AA and MAA), the salts of 2-acrylamido-2-methylpropanesulphonic acid, $CH_2=CH-CO-NH-C(CH_3)_2-CH_2-SO_3-N^+(C_2H_5)_3$ (AMPS/TEA), dimethylacrylamide (DMA), and dimethylaminoethyl methacrylate (MADAME).

* * * * *